US010037450B2

(12) United States Patent
Ukai et al.

(10) Patent No.: US 10,037,450 B2
(45) Date of Patent: Jul. 31, 2018

(54) INFORMATION CODE IMAGE DISPLAY SYSTEM, INFORMATION CODE IMAGE DISPLAY TERMINAL, INFORMATION CODE IMAGE DISPLAY PROGRAM, SERVER, AND INFORMATION CODE IMAGE GENERATING PROGRAM

(71) Applicant: DENSO CORPORATION, Kariya, Aichi-pref. (JP)

(72) Inventors: Hiroki Ukai, Kariya (JP); Masatoshi Aboh, Kariya (JP); Hiroshi Kuwahara, Kariya (JP); Yousuke Kimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/556,452

(22) PCT Filed: Mar. 4, 2016

(86) PCT No.: PCT/JP2016/001201
§ 371 (c)(1),
(2) Date: Sep. 7, 2017

(87) PCT Pub. No.: WO2016/147589
PCT Pub. Date: Sep. 22, 2016

(65) Prior Publication Data
US 2018/0053020 A1 Feb. 22, 2018

(30) Foreign Application Priority Data

Mar. 13, 2015 (JP) .................................. 2015-050721

(51) Int. Cl.
*G06K 7/10* (2006.01)
*G06F 3/0484* (2013.01)
(Continued)

(52) U.S. Cl.
CPC ......... *G06K 7/1095* (2013.01); *G06F 3/0481* (2013.01); *G06F 3/04845* (2013.01); *G06K 7/1443* (2013.01); *G06F 2203/04806* (2013.01)

(58) Field of Classification Search
CPC .................................................... G06K 7/1095
(Continued)

(56) References Cited

U.S. PATENT DOCUMENTS 8,456,486 B2 * 6/2013 Ihara .................. H04N 1/32203
235/375
8,548,232 B2 * 10/2013 Yamada ............... H04N 1/6086
382/162

(Continued)

FOREIGN PATENT DOCUMENTS

JP 2004102385 A 4/2004
JP 2006118997 A 5/2006

(Continued)

OTHER PUBLICATIONS

MapQR is the geocode for human and machine, URL: https://www.denso.co.jp/ja/news/event/tradeshows/2014/files/ceatec14_mapQR.pdf.

*Primary Examiner* — Seung Lee
(74) *Attorney, Agent, or Firm* — Harness, Dickey & Pierce, P.L.C.

(57) ABSTRACT

An information code image display system includes an area specifying part, an image generation part, and a display controller. The area specifying part specifies an area as a conversion target area, the area being a part of a base image displayed in a display area of a display part. The image generation part generates a base-image-attached information code image by applying an information code to a conversion target image corresponding to the conversion target area. The display controller displays in the display part the base-image-attached information code image and a remain- (Continued)

ing image obtained by excluding an image of the conversion target area from the base image.

19 Claims, 13 Drawing Sheets

(51) Int. Cl.
*G06K 7/14* (2006.01)
*G06F 3/0481* (2013.01)

(58) Field of Classification Search
USPC .......................................... 235/462.01, 494
See application file for complete search history.

(56) References Cited

U.S. PATENT DOCUMENTS

| | | | |
|---|---|---|---|
| 9,253,388 B2* | 2/2016 | Kinoshita | G03B 5/00 |
| 2009/0255992 A1* | 10/2009 | Shen | G06K 19/06037 |
| | | | 235/462.1 |
| 2013/0026239 A1* | 1/2013 | Sakahashi | G06K 19/06037 |
| | | | 235/494 |
| 2015/0147739 A1* | 5/2015 | Park | G09B 5/062 |
| | | | 434/308 |
| 2016/0078336 A1 | 3/2016 | Ari | |

FOREIGN PATENT DOCUMENTS

| | | | |
|---|---|---|---|
| JP | 2014209338 A | 11/2014 | |
| JP | 2015004751 A | 1/2015 | |

* cited by examiner

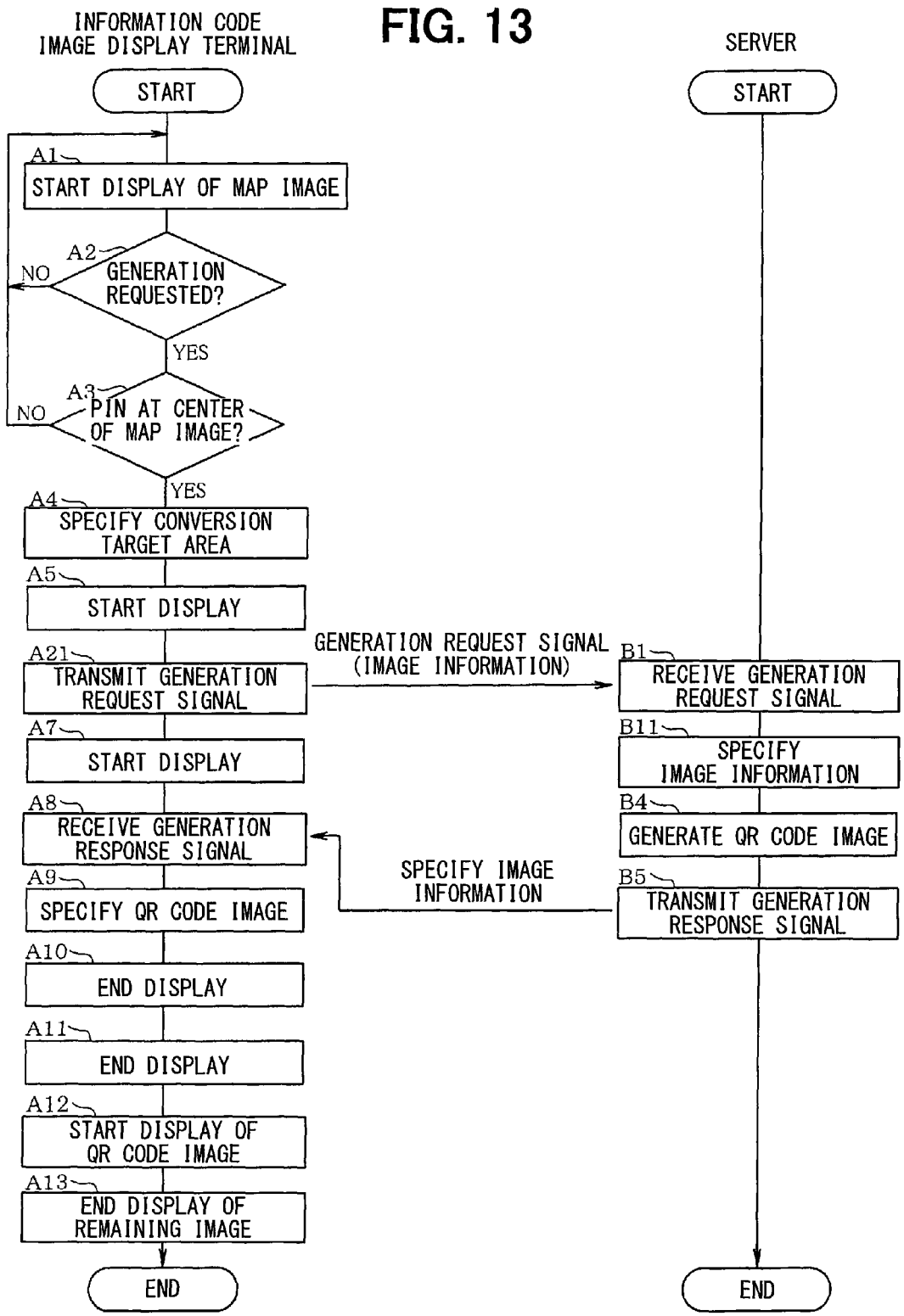

INFORMATION CODE IMAGE DISPLAY SYSTEM, INFORMATION CODE IMAGE DISPLAY TERMINAL, INFORMATION CODE IMAGE DISPLAY PROGRAM, SERVER, AND INFORMATION CODE IMAGE GENERATING PROGRAM

CROSS REFERENCE TO RELATED APPLICATIONS

This application is a U.S. National Phase Application under 35 U.S.C. 371 of International Application No. PCT/JP2016/001201 filed on Mar. 4, 2016 and published in Japanese as WO 2016/147589 A1 on Sep. 22, 2016. This application is based on and claims the benefit of priority from Japanese Patent Application No. 2015-050721 filed on Mar. 13, 2015. The entire disclosures of all of the above applications are incorporated herein by reference.

TECHNICAL FIELD

The present disclosure relates to an information code image display system, an information code image display terminal, an information code image display program, a server, and an information code image generating program.

BACKGROUND ART

There is provided a technology for applying (superimposing) an information code such as a QR code (registered trademark) to a base image, and generating and displaying a base-image-attached information code image (referring to Patent Literature 1, for example). By using a map image as the base image, it is possible to apply an information code to the map image, and generate and display a map-image-attached information code image.

PRIOR ART LITERATURE

Patent Literature

Patent Literature 1: JP 2014-209338 A

SUMMARY OF INVENTION

When an area to which the information code is applied is limited to a part of the base image instead of an entire base image, the information code is applied to only the part of the base image, and a base-image-attached information code image is generated and displayed. However, when the information code is applied to only the part of the base image, an area to which the information code is applied in the entire base image becomes unclear, and a user may possibly fails to grasp the area to which the information code is applied.

It is an object of the present disclosure to provide an information code image display system, an information code image display terminal, an information code image display program, a server, and an information code image generating program, all of which capable of improving convenience by allowing a user to appropriately grasp an area to which an information code is applied when the information code is applied to only a part of a base image instead of an entire base image.

According to one example of the present disclosure, an information code image display system includes an area specifying part, an image generation part, and a display controller. The area specifying part specifies an area as a conversion target area upon occurrence of a generation request for an information code image, the area being a part of an entire base image displayed in a display area of a display part. The image generation part generates a base-image-attached information code image by applying an information code to a conversion target image corresponding to the conversion target area specified by the area specifying part. The display controller displays the base-image-attached information code image and a remaining image at the same time in the display part, the base-image-attached information code image being generated by the image generation part, the remaining image being obtained by excluding an image of the conversion target area from the base image.

According to another example of the present disclosure, an information code image display terminal accessible to a server includes an area specifying part, a terminal-side transmission controller, a terminal-side reception controller, and a display controller. The area specifying part specifies an area as a conversion target area upon occurrence of a generation request for an information code image, the area being a part of an entire base image displayed in a display area of a display part. The terminal-side transmission controller transmits required generation information to the server, the required generation information being information required for generation of a base-image-attached information code image. The terminal-side reception controller receives a base-image-attached information code image from the server. The display controller displays the base-image-attached information code image and a remaining image at a same time in the display part, the base-image-attached information code image being received by the terminal-side reception controller, the remaining image being obtained by excluding an image of the conversion target area from the base image.

According to another example of the present disclosure, an information code image display program causes a terminal-side controller of an information code image display terminal accessible to a server to execute: an area specifying process of specifying an area as a conversion target area upon occurrence of a generation request for an information code image, the area being a part of an entire base image displayed in a display area of a display part; a terminal-side transmission control process of transmitting required generation information to the server, the required generation information being information required for generation of a base-image-attached information code image; a terminal-side reception control process of receiving a base-image-attached information code image from the server; and a display control process of displaying the base-image-attached information code image and a remaining image at a same time in the display part, the base-image-attached information code image being received in the terminal-side reception control process, the remaining image being obtained by excluding an image of the conversion target area from the base image.

According to another example of the present disclosure, a server to which an information code image display terminal is accessible includes a server-side reception controller, an image generation part, and a server-side transmission controller. The server-side reception controller receives required generation information from the information code image display terminal, the required generation information being information required for generation of a base-image-attached information code image. The image generation part generates a base-image-attached information code image by specifying a conversion target image corresponding to a conversion target area based on the required generation information received by the server-side reception controller, and applying an information code to the specified conversion target image. The server-side transmission controller transmits the base-image-attached information code image generated by the image generation part to the information code image display terminal.

According to another example of the present disclosure, an information code image generating program that causes a server-side controller of a server to which an information code image display terminal is accessible to execute: a server-side reception control process of receiving required generation information from the information code image display terminal, the required generation information being information required for generation of a base-image-attached information code image; an image generation process of generating a base-image-attached information code image by specifying a conversion target image corresponding to a conversion target area based on the required generation information received in the server-side reception control process, and applying an information code to the specified conversion target image; and a server-side transmission control process of transmitting the base-image-attached information code image generated in the image generation process to the information code image display terminal.

When a base-image-attached information code image is generated, the base-image-attached information code image and a remaining image, which is obtained by excluding an image for a conversion target area from the base image, are displayed at the same time, instead of displaying only the generated base-image-attached information code image. With this, it is possible for the user to appropriately grasp the area to which the information code is applied, and to improve convenience. For example, in a case in which a map image is used as the base image, while portions for streets can become unclear or names for municipal governments or facilities can be erased due to information coding in the map-image-attached information code image, portions for streets remain clear and names for municipal governments or facilities remain displayed in the remaining image. Therefore, by displaying the remaining image continuously when the base-image-attached information code image is displayed, the user may appropriately grasp the area to which the information code is applied based on the remaining image in which names for municipal governments or facilities remain displayed. In this manner, it is possible for the user to appropriately grasp the area to which the information code is applied, and to improve convenience.

BRIEF DESCRIPTION OF DRAWINGS

The above and other aspects, features and advantages of the present disclosure will become more apparent from the following detailed description made with reference to the accompanying drawings. In the drawings:

FIG. 13 is a flowchart of an operation by an information code image display terminal and a server according to a second embodiment.

DESCRIPTION OF EMBODIMENTS (First Embodiment)

Hereinafter, a first embodiment of the present disclosure will be described with reference to FIG. 1 to FIG. 12.

Figure 1:
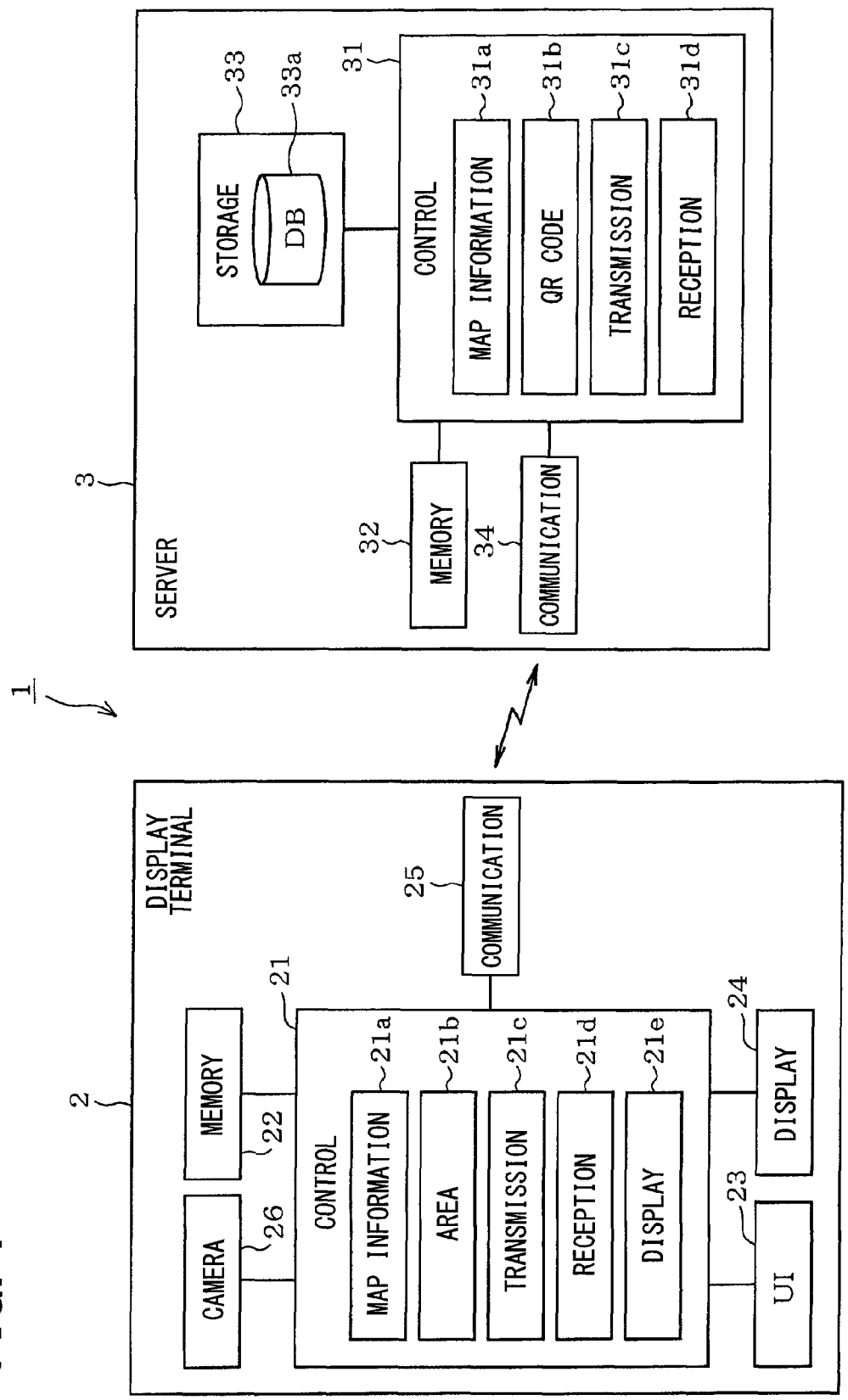
FIG. 1 is a diagram illustrating an entire configuration of an information code image display system according to a first embodiment.

As illustrated in FIG. 1, an information code image display system 1 includes an information code image display terminal 2 and a server 3, which are connected so as to be able to perform data communication via a communication network (including the Internet). In the present embodiment, the information code image display terminal 2 is a smartphone (multi-functional mobile phone), for example, and an information code is a QR code (registered trademark), for example. QR stands for quick response. Further, in the present embodiment, the server 3 is assumed to be a server having a function for generating a QR code and a function for storing map information. In addition, many and unspecified information code image display terminals 2 are accessible to the server 3.

The information code image display terminal 2 includes a controller 21 (corresponding to a terminal-side controller), a memory 22, a user interface (UI (User Interface)) 23, a display part 24, a communication part 25, and a camera 26. The controller 21 is configured by a microcomputer having a CPU (Central Processing Unit), a ROM (Read Only Memory), a RAM (Random Access Memory), and I/O (Input/Output). The memory 22 (corresponding to a non-transitory storage medium) is configured by a semiconductor memory device or the like, for example, and records a computer program. The controller 21 executes the computer programs recorded in the memory 22, and controls an overall operation of the information code image display terminal 2.

The user interface 23 is configured by a touch panel provided for a screen of the display part 24 and mechanical switches, for example, and upon reception of an operation by a user, outputs an operation detection signal indicating a content of the operation to the controller 21. The display part 24 is configured by a liquid crystal panel, an organic EL (Electro-Luminescence) panel, or the like, for example, and upon input of a display command signal from the controller 21, displays (draws) a screen specified by the input display command signal. The communication part 25 controls transmission and reception of various signals with the server 3 via the communication network (data communication). The camera 26 includes a CCD (Charge Coupled Device) image sensor or a CMOS (Complementary Metal Oxide Semiconductor) image sensor. When an imaging command signal is input from the controller 21, the camera 26 performs an imaging operation, and outputs an image that has been taken and obtained to the controller 21. Here, the information code image display terminal 2 has various known functions relating to telephones, such as a function of inputting voice of a user as transmitting voice, a function of outputting voice of a speaker through a telephone received via the communication network as receiving voice, and a function of recording phonebook data.

The controller 21 includes a map information acquisition part 21a (corresponding to a map information acquirer), an area specifying part 21b (corresponding to an area specifier), a transmission controller 21c (corresponding to a terminal-side transmission controller), a reception controller 21d (corresponding to a terminal-side reception controller), and a display controller 21e (corresponding to a display controller). The map information acquisition part 21a, the area specifying part 21b, the transmission controller 21c, the reception controller 21d, and the display controller 21e are configured by computer programs (including an information code image display program) executed by the controller 21, and realized in a software manner.

When the user activates a map image display application, and inputs point information (such as facility's name, phone number, and address, for example) indicating a point, for example, the map information acquisition part 21a obtains map information for a surrounding area centering latitude-longitude in the input point information (for example, an area of a predetermined radius centering the latitude-longitude) from exterior (the server 3, or a map distribution server, other than the server 3, dedicated for distribution of map information, for example). Here, when the information code image display terminal 2 is configured to store map information, the map information acquisition part 21a may obtain map information stored in the information code image display terminal 2 instead of obtaining from exterior.

Figure 2:
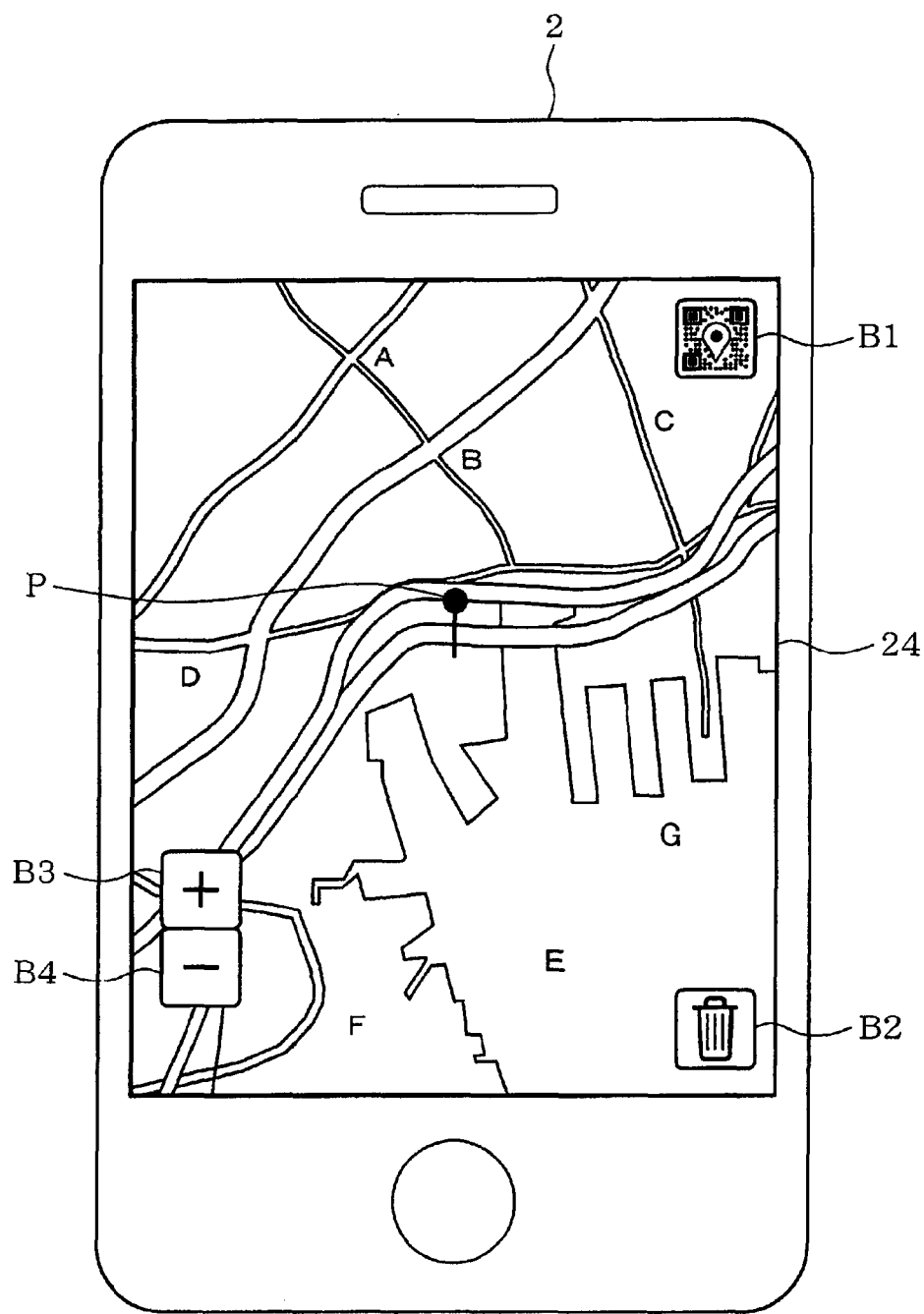
FIG. 2 is a diagram illustrating an example in which a map image is displayed.
Figure 3:
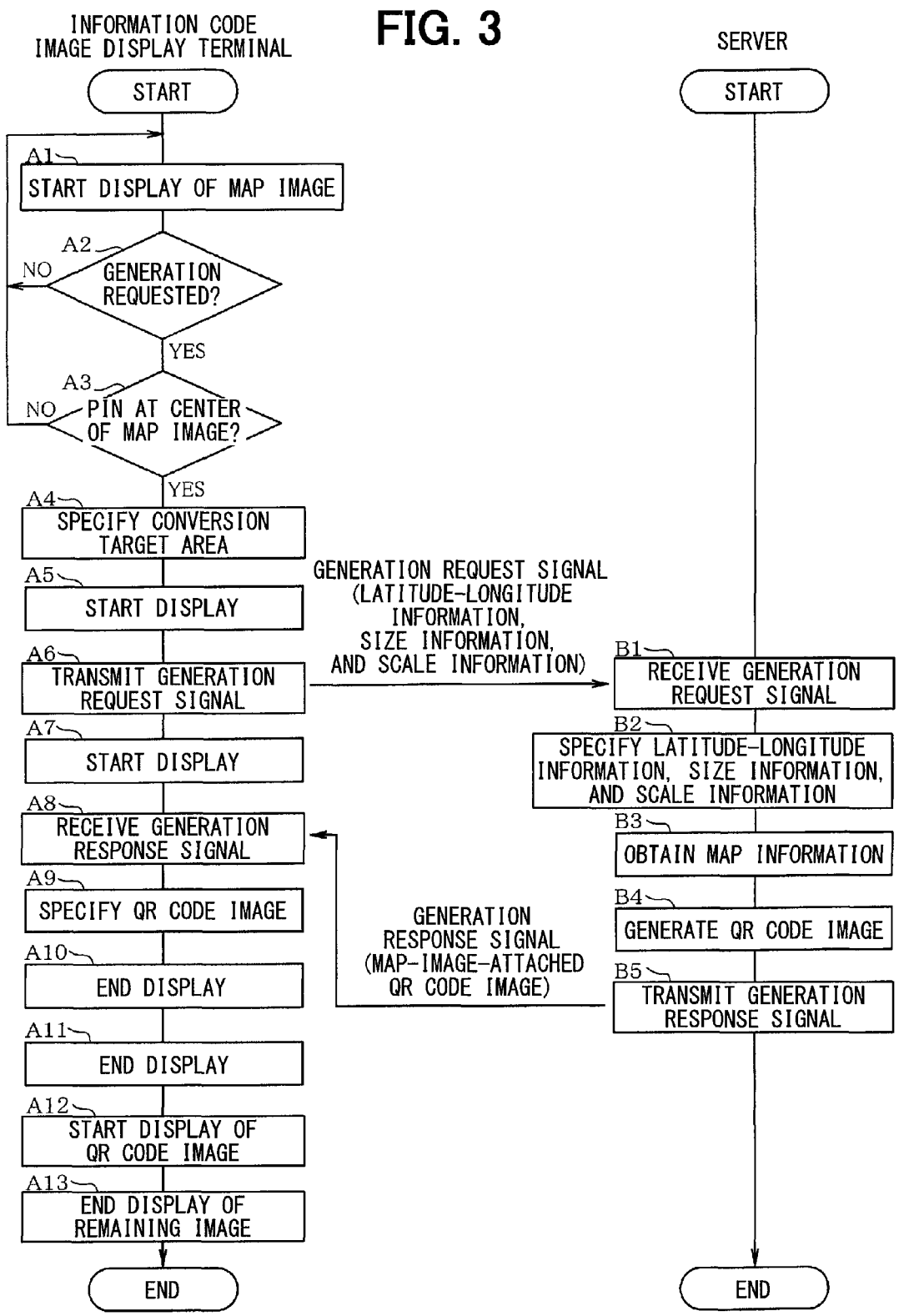
FIG. 3 is a flowchart of an operation by an information code image display terminal and an operation of a server.

When the map information acquisition part 21a obtains map information, the display controller 21e causes the display part 24 to display a map image (base image) included in the obtained map information, as illustrated in FIG. 2. In this case, the display controller 21e causes the map image to be displayed such that latitude-longitude in the point information input by the user comes substantially at the center of a display area of the display part 24, and then, causes a pin P (a reference point) to be displayed over the map image at the latitude-longitude in the point information input by the user. Further, the display controller 21e causes a conversion start button B1, a point erase button B2, a zoom-in button B3, and a zoom-out button B4, each of which can be pressed (touched) by the user, to be displayed over the map image. Here, in each of FIG. 2, FIG. 4, FIG. 5, FIG. 6, FIG. 7, FIG. 8, FIG. 9, FIG. 10, FIG. 11, and FIG. 12, a town A is indicated by A, a town B is indicated by B, a town C is indicated by C, a town D is indicated by D, a bay E is indicated by E, a seaside park F is indicated by F, and a ferry terminal is indicated by G.

When pressing of the point erase button B2 by the user is detected, the display controller 21e causes the displayed pin P to be erased. When pressing of the zoom-in button B3 by the user is detected, the display controller 21e causes the map image to be enlarged centering the position of the pin P. When pressing of the zoom-out button B4 by the user is detected, the display controller 21e causes the map image to be contracted centering the position of the pin P. When pressing of the conversion start button B1 by the user (occurrence of a request for generating an information code image) is detected, the display controller 21e performs a display control process described later in detail in cooperation with the area specifying part 21b, and the like.

When pressing of the conversion start button B1 by the user is detected, the area specifying part 21b specifies a part of the map image displayed by the display part 24 as a conversion target area. Specifically, the area specifying part 21b specifies an area of a predetermined size centering the position of the pin P as the conversion target area. The transmission controller 21c controls transmission of various signals including various pieces of information to the server 3. The reception controller 21d controls reception of various signals including various pieces of information from the server 3.

The server 3 includes a controller 31 (corresponding to a server-side controller), a memory 32 (corresponding to a non-transitory storing medium), a storage 33, and a communication part 34. The controller 31 is configured by a microcomputer having a CPU, a ROM, a RAM, and I/O. The memory 32 is configured by a semiconductor memory device or the like, for example, and records computer programs. The controller 31 executes the computer programs recorded in the memory 32, and controls an overall operation of the server 3. The storage 33 is configured by a recording medium such as a hard disk, and stores various pieces of information such as the map information in a database 33a. The communication part 34 controls transmission and reception of various signals with the information code image display terminal 2 via the communication network.

The controller 31 includes a map information acquisition part 31a (corresponding to a map information acquirer), a QR code image generation part 31b (corresponding to an image generator), a transmission controller 31c (corresponding to a server-side transmission controller), and a reception controller 31d (corresponding to a server-side reception controller). The map information acquisition part 31a, the QR code image generation part 31b, the transmission controller 31c, and the reception controller 31d are configured by computer programs (including an information code image generating program) executed by the controller 31, and realized in a software manner.

The map information acquisition part 31a obtains map information from the database 33a. When the map information acquisition part 31a obtains the map information, the QR code image generation part 31b applies (superimposes) a QR code to a map image included in the obtained map information to generate a map-image-attached QR code image (a base-image-attached information code image). The transmission controller 31c controls transmission of various signals including various pieces of information to the information code image display terminal 2. The reception controller 31d controls reception of various signals including various pieces of information from the information code image display terminal 2.

Next, effects of the above-described configuration will be described with reference to FIG. 3 to FIG. 12. Here, the description will be made on an operation performed by the information code image display terminal 2 and the server 3 in cooperation with each other in a case in which the user activates a map image display application in the information code image display terminal 2 to display a map image, and then presses the conversion start button B1

Figure 4:
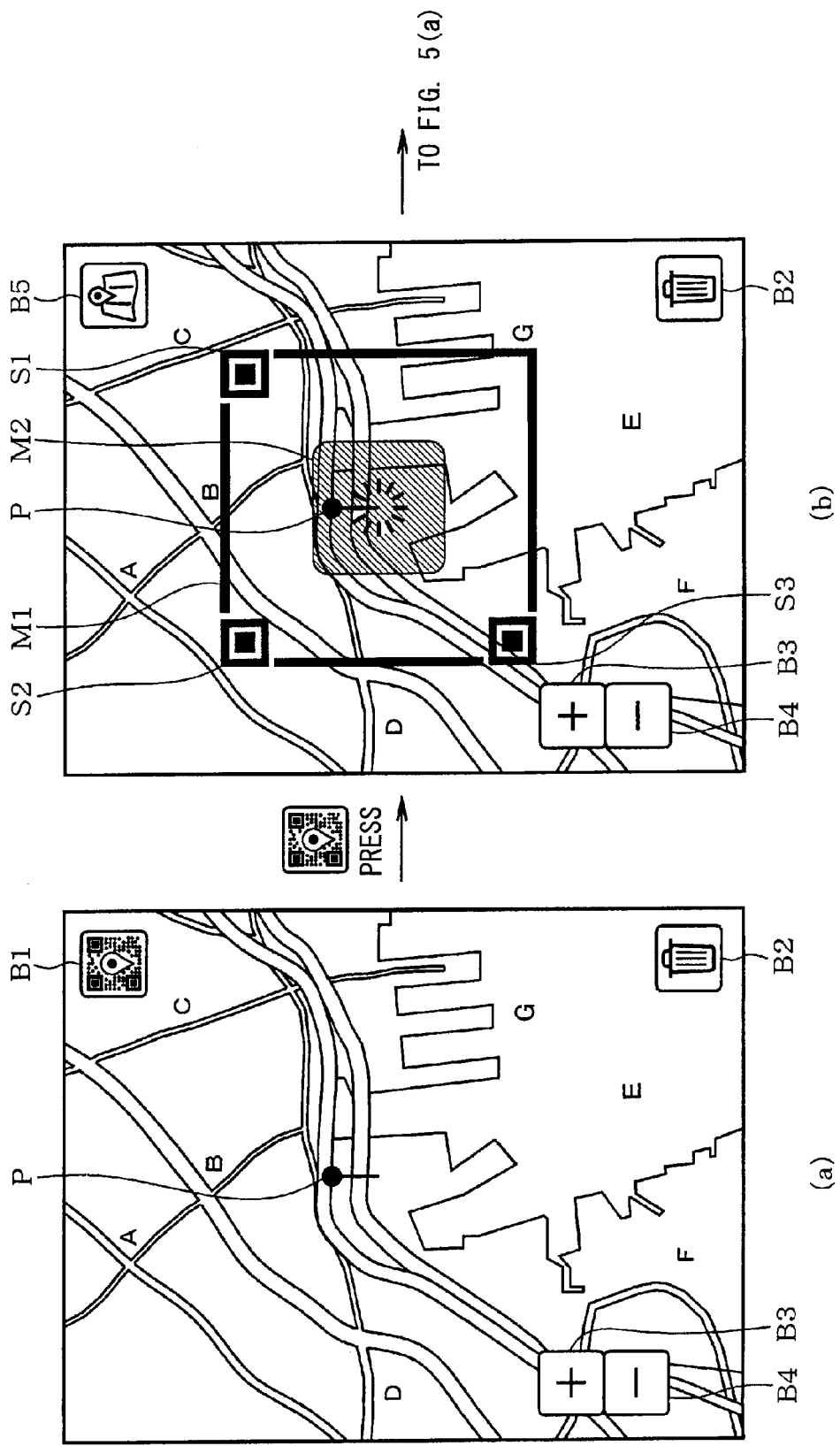
FIG. 4 is a diagram illustrating (a) and (b) showing an example in which an image changes to (a) of FIG. 5.

On the information code image display terminal 2, when the user activates a map image display application and inputs point information indicating a point, for example, the controller 21 obtains map information for a surrounding area centering latitude-longitude in the input point information, and starts displaying a map image included in the obtained map information as illustrated in (a) of FIG. 4 (A1). In this case, the controller 21 causes the map image to be displayed such that latitude-longitude in the point information input by the user comes substantially at the center of a display area of the display part 24, and then, causes a pin P to be displayed over the map image at the latitude-longitude in the point information input by the user. In this state, the controller 21 is able and ready to accept pressing of any of the buttons B1-B4 by the user. In the following, a case in which the user presses the conversion start button B1 will be described.

When pressing of the conversion start button B1 by the user (occurrence of a request for generating a QR code image) is detected (A2: YES), the controller 21 determines whether the pin P is present substantially at the center of the map image displayed in the display part 24 (A3). When it is determined that the pin P is present substantially at the center of the map image (A3: YES), the controller 21 enables the pressing of the conversion start button B1 by the user, and specifies an area of a predetermined size centering (based on) the position of the pin P as a conversion target area (A4, area specifying process). In this case, the controller 21 specifies the area of the predetermined size to be smaller than the display area of the display part 24.

Subsequently, upon specifying the conversion target area, the controller 21 starts to display a conversion target area notification image M1 indicating the specified conversion target area, as illustrated in (b) of FIG. 4 (A5). In this case, the controller 21 causes the display part 24 to display a frame-shaped image as the conversion target area notification image M1 over the map image. Further, the controller 21 causes symbols S1-S3 which are marks unique to QR codes to be displayed in order to indicate that the information code used in the coding thereafter is a QR code. Further, the controller 21 causes a return button B5 to be displayed over the map image instead of the conversion start button B1. When pressing of the return button B5 by the user is detected, the controller 21 stops displaying the conversion target area notification image M1, and returns to the display illustrated in (a) of FIG. 4.

Next, the controller 21 causes the transmission controller 21c to transmit a generation request signal from the communication part 25 to the server 3 (A6, terminal-side transmission control process). The generation request signal includes latitude-longitude information indicating latitude-longitude of the center of the conversion target area (latitude-longitude of the point information input by the user), size information indicating a size of the conversion target area (for example, number of pixels), scale information indicating a scale of the map image as required generation information. Then, the controller 21 starts to wait reception of a generation response signal from the server 3. After starting to wait reception of the generation response signal from the server 3, the controller 21 starts to display a waiting notification image M2 indicating that display of a map-image-attached QR code image is being waited as illustrated in (b) of FIG. 4 (A7). In this case, the controller 21 causes the display part 24 to display the waiting notification image M2 over the map image. In the present embodiment, by starting to display the conversion target area notification image M1 before transmission of the generation request signal, and starting to display the waiting notification image M2 after transmission of the generation request signal, display of the conversion target area notification image M1 is first started, and then display of the waiting notification image M2 is started. However, display of the conversion target area notification image M1 and the waiting notification image M2 may be started at the same time before or after transmission of the generation request signal ((b) of FIG. 4 shows a state in which display of both the conversion target area notification image M1 and the waiting notification image M2 are started).

On the server 3, when the generation request signal transmitted from the information code image display terminal 2 is received by the reception controller 31d (B1, server-side reception control process), the controller 31 specifies (extracts) the latitude-longitude information, the size information, and the scale information included in the received generation request signal (B2). Next, the controller 31 obtains, from the database 33a, map information that corresponds to the latitude-longitude information, the size information, and the scale information that have been specified (B3).

After the corresponding map information is obtained from the database 33a, the controller 31 activates a QR code generating application. The controller 31 then generates a map-image-attached QR code image (a base-image-attached information code image) by applying (superimposing) a QR code to a map image (conversion target image) included in the obtained map information (B4, image generation process). In this case, when the information code image display terminal 2 obtains and displays map information stored in the database 33a, the controller 31 will generate a map-image-attached QR code image using a part of a map image derived from the same map information that configures the map image. On the other hand, when the information code image display terminal 2 obtains and displays map information different from the map information stored in the database 33a, the controller 31 will generate a map-image-attached QR code image using a part of a map image derived from map information different from the map information that configures the map image. Then, the controller 31 causes a transmission controller 31e to transmit a generation response signal including the map-image-attached QR code image generated in this manner from the communication part 34 to the information code image display terminal 2 (B5, server-side transmission control process).

On the information communication terminal 2, upon reception of the generation response signal transmitted from the server 3 by the reception controller 21d (A8, terminal-side reception control process), the controller 21 specifies (extracts) the map-image-attached QR code image included in the received generation response signal (A9). Then, the controller 21 ends (erases) the display of the conversion target area notification image M1 (A10), ends (erases) the display of the waiting notification image M2 (A11), and starts displaying a map-image-attached QR code image M3 that has been specified as illustrated in (a) of FIG. 5 (A12, display control process). In this case, the controller 21 causes the map-image-attached QR code image M3 and a remaining image (frame-shaped remaining image) M5, which is obtained by excluding an image for the conversion target area from the map image, to be displayed at the same time by displaying the map-image-attached QR code image M3 incorporated in the conversion target area. Here, the map-image-attached QR code image M3 includes the symbols S1-S3, as well as a point mark M4 indicating the original position of the pin P.

Figure 5:
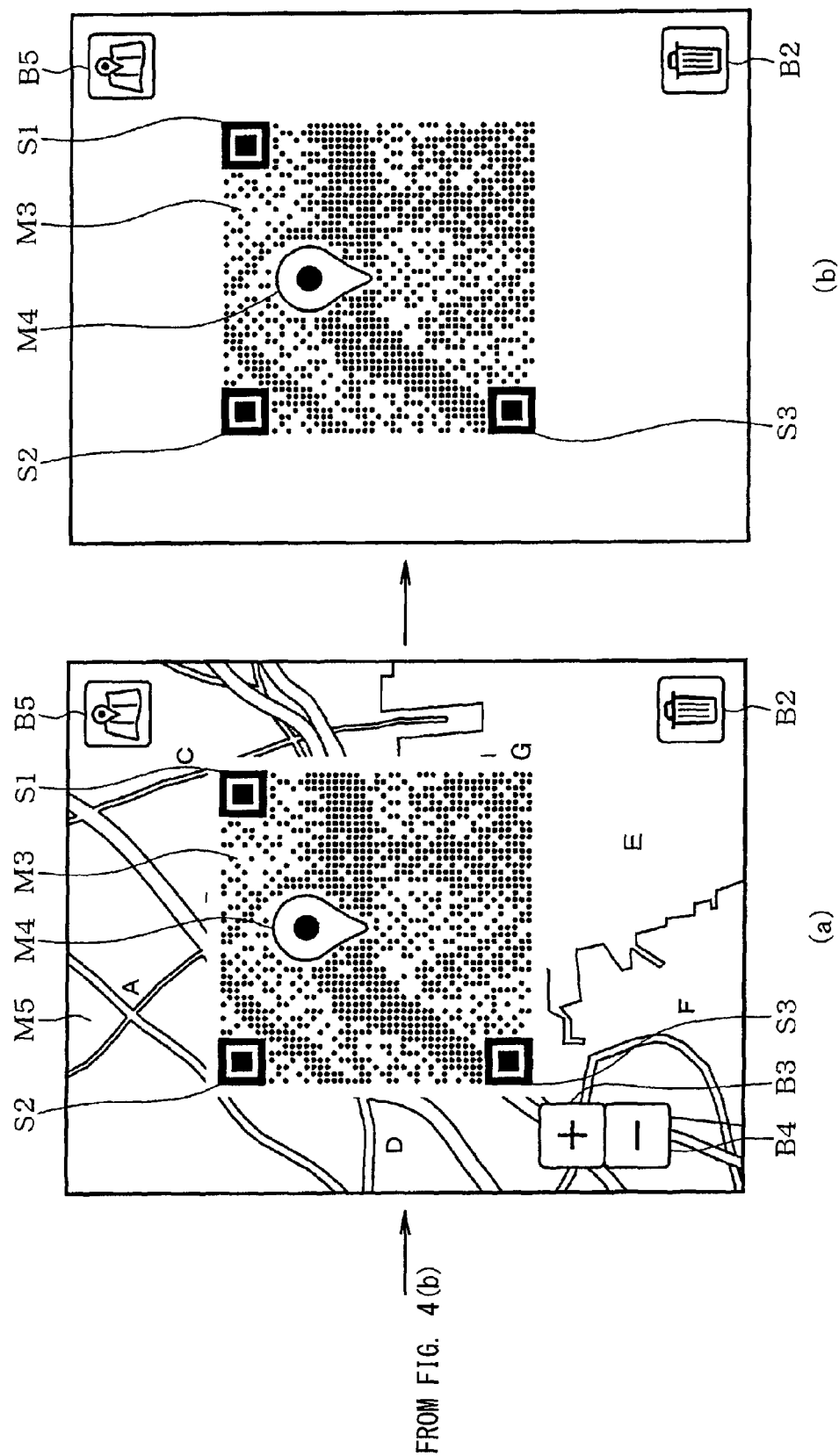
FIG. 5 is a diagram illustrating (a) and (b) showing an example in which the image changes from (b) of FIG. 4.
Figure 6:
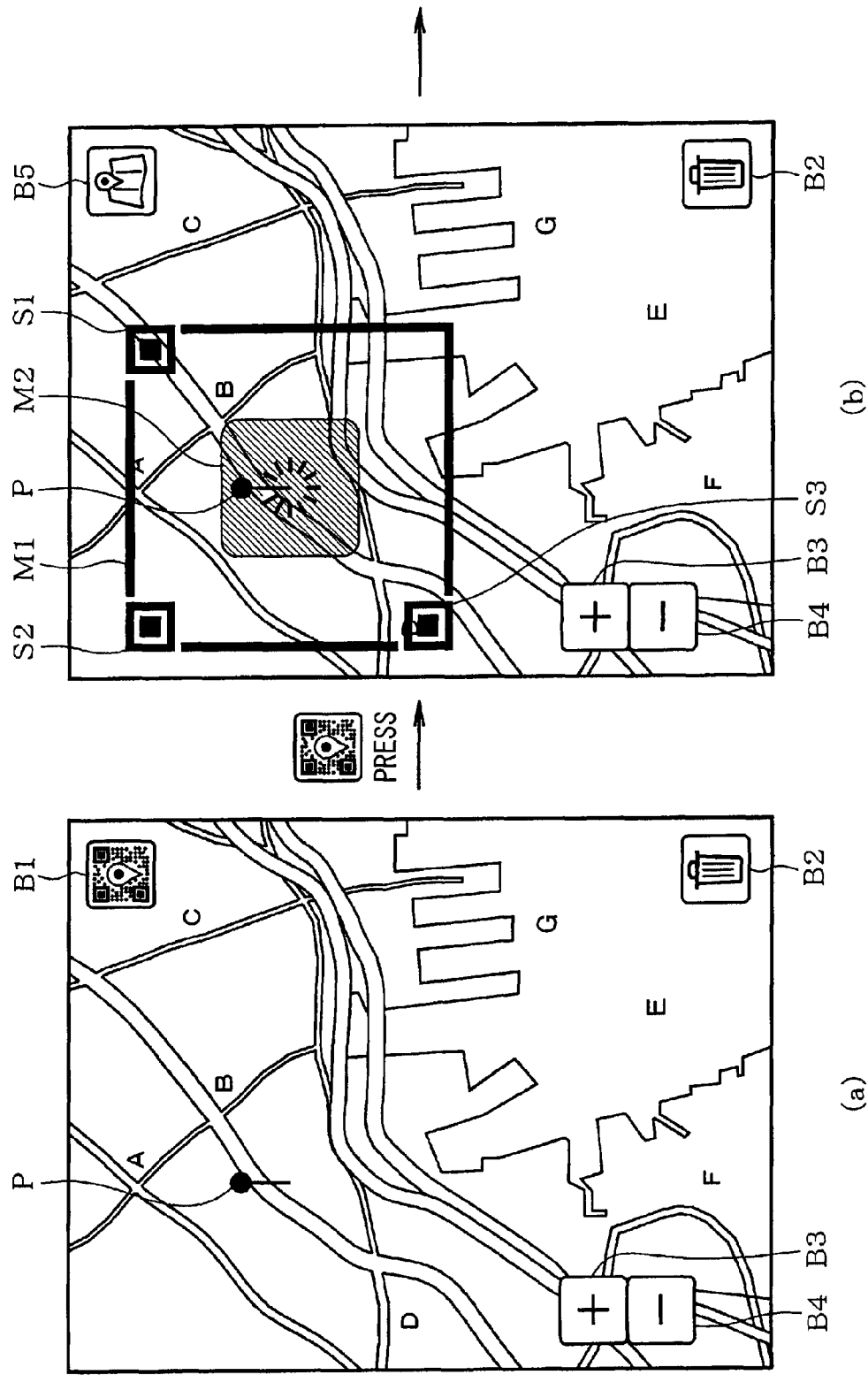
FIG. 6 is a diagram illustrating (a) and (b) showing an example in which an image changes.
Figure 7:
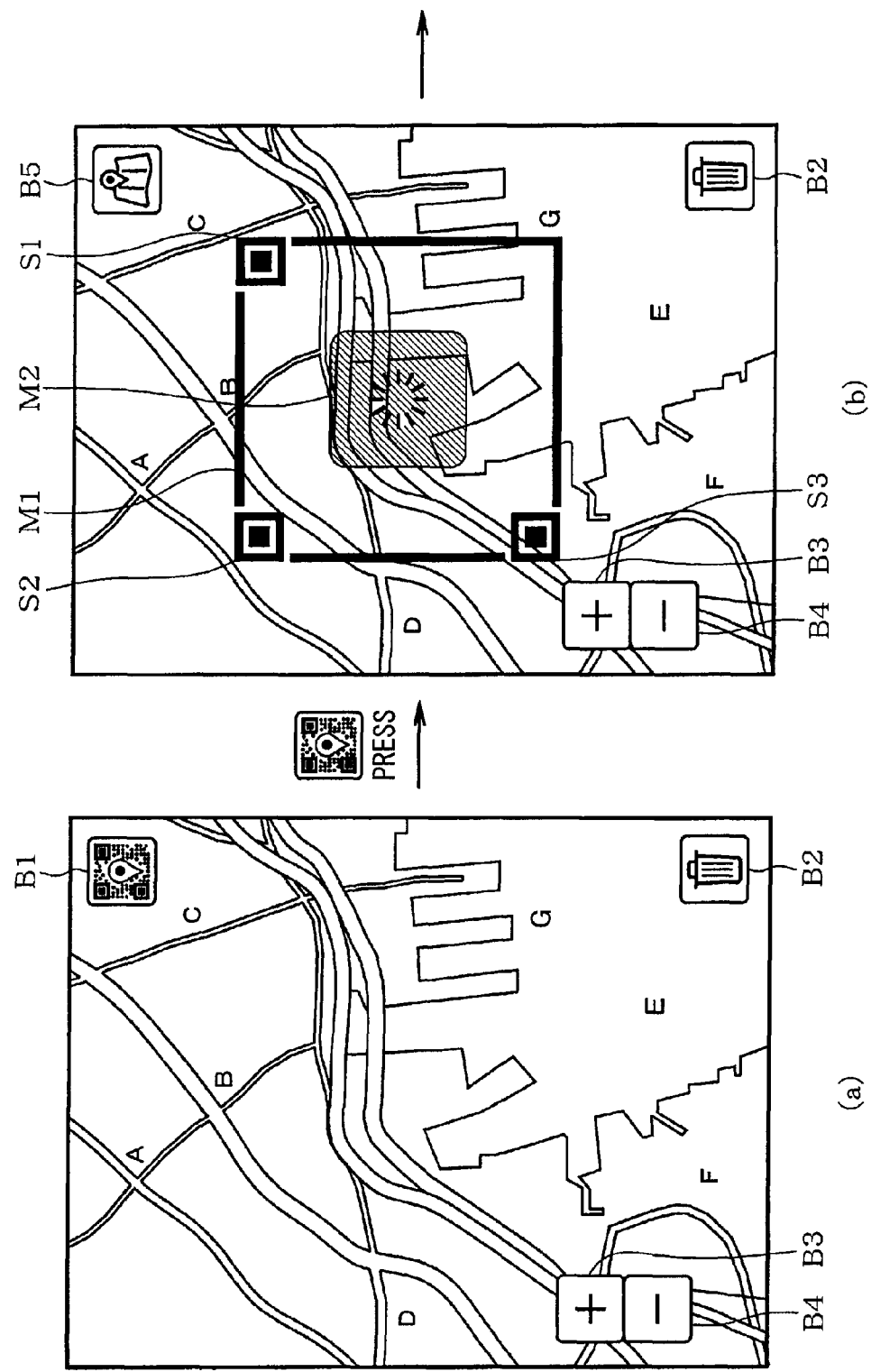
FIG. 7 is a diagram illustrating (a) and (b) showing an example in which an image changes.
Figure 8:
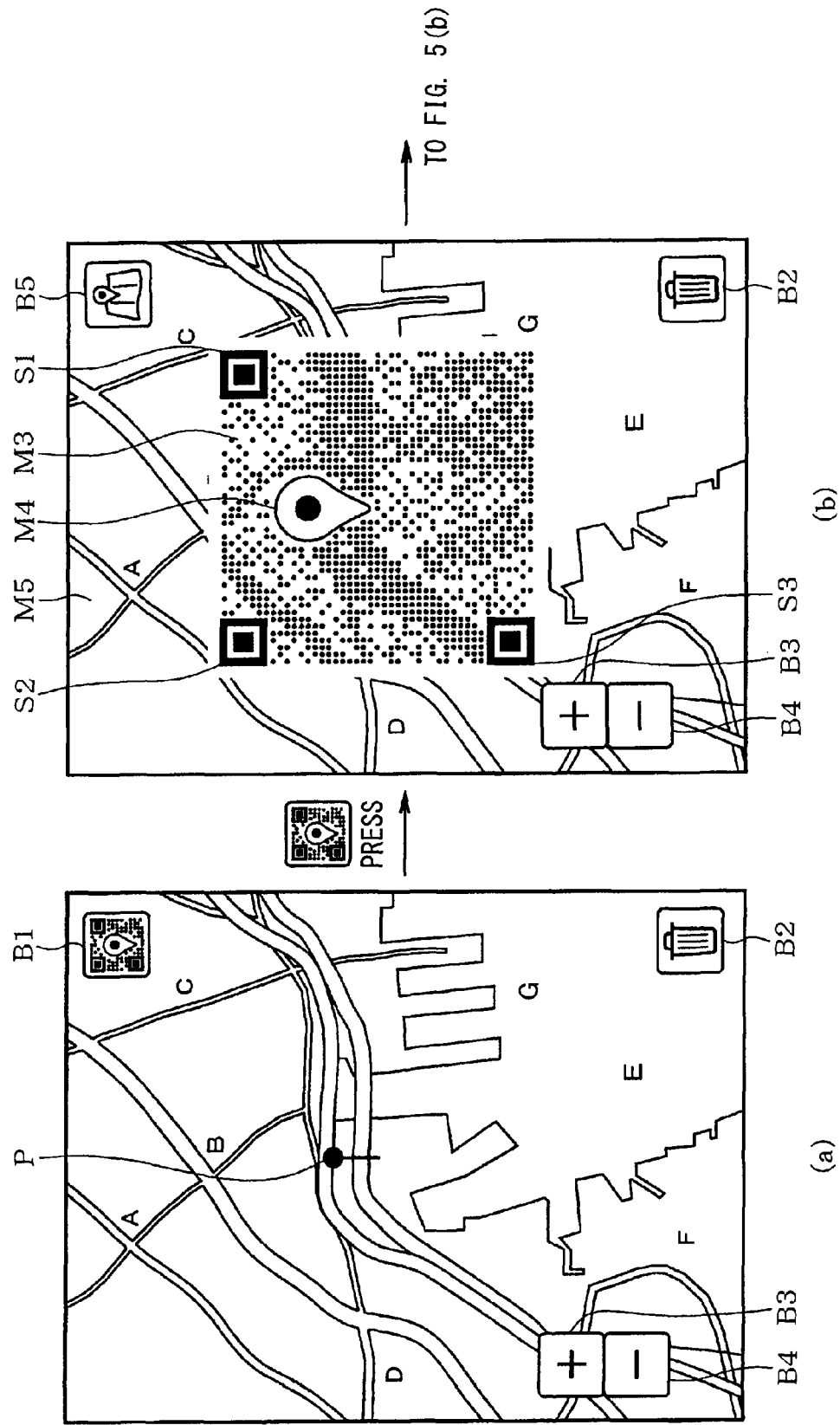
FIG. 8 is a diagram illustrating (a) and (b) showing an example in which an image changes to (b) of FIG. 5.
Figure 9:
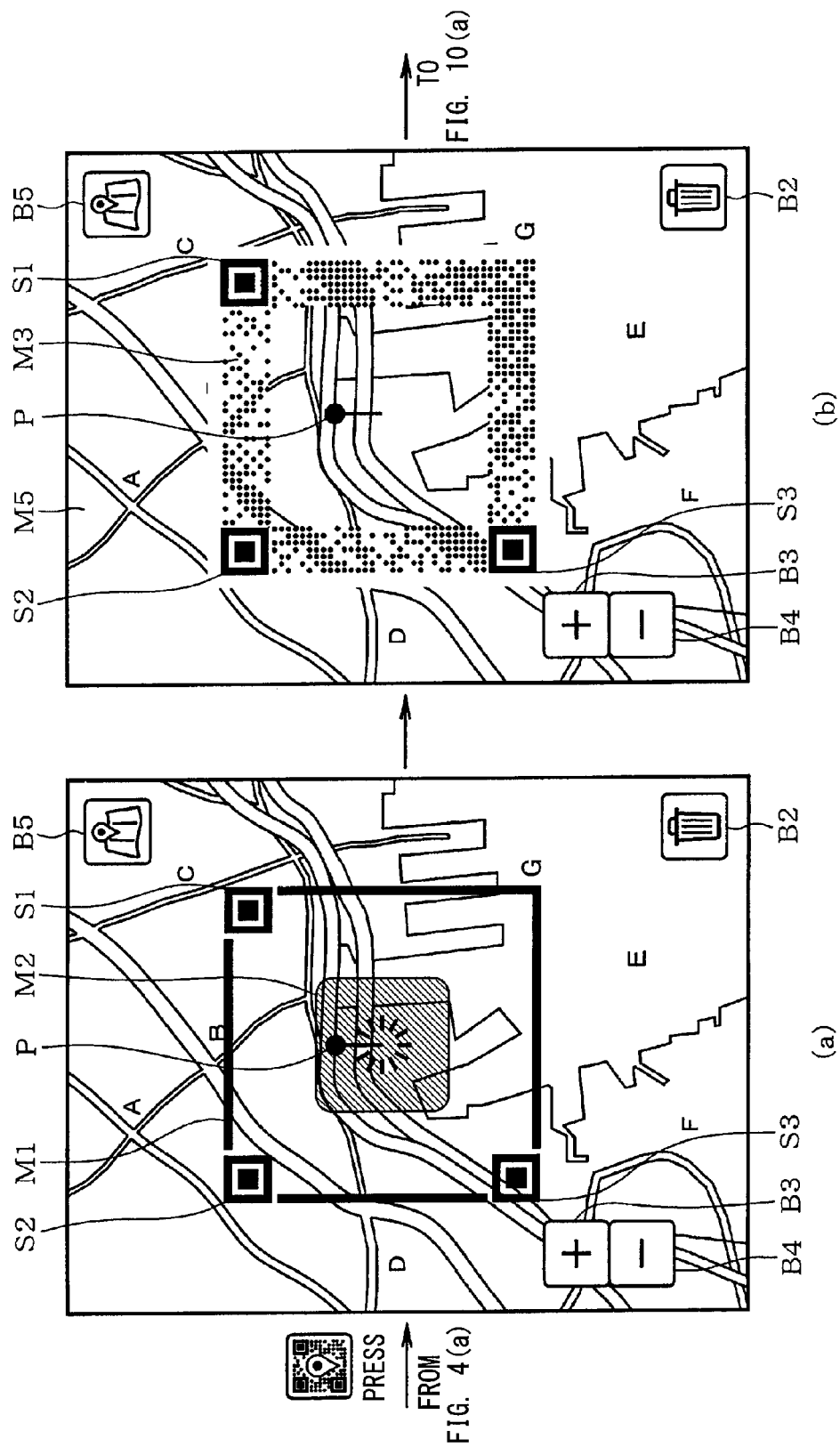
FIG. 9 is a diagram illustrating (a) and (b) showing an example in which the image changes from (a) of FIG. 4 to (a) of FIG. 10.
Figure 10:
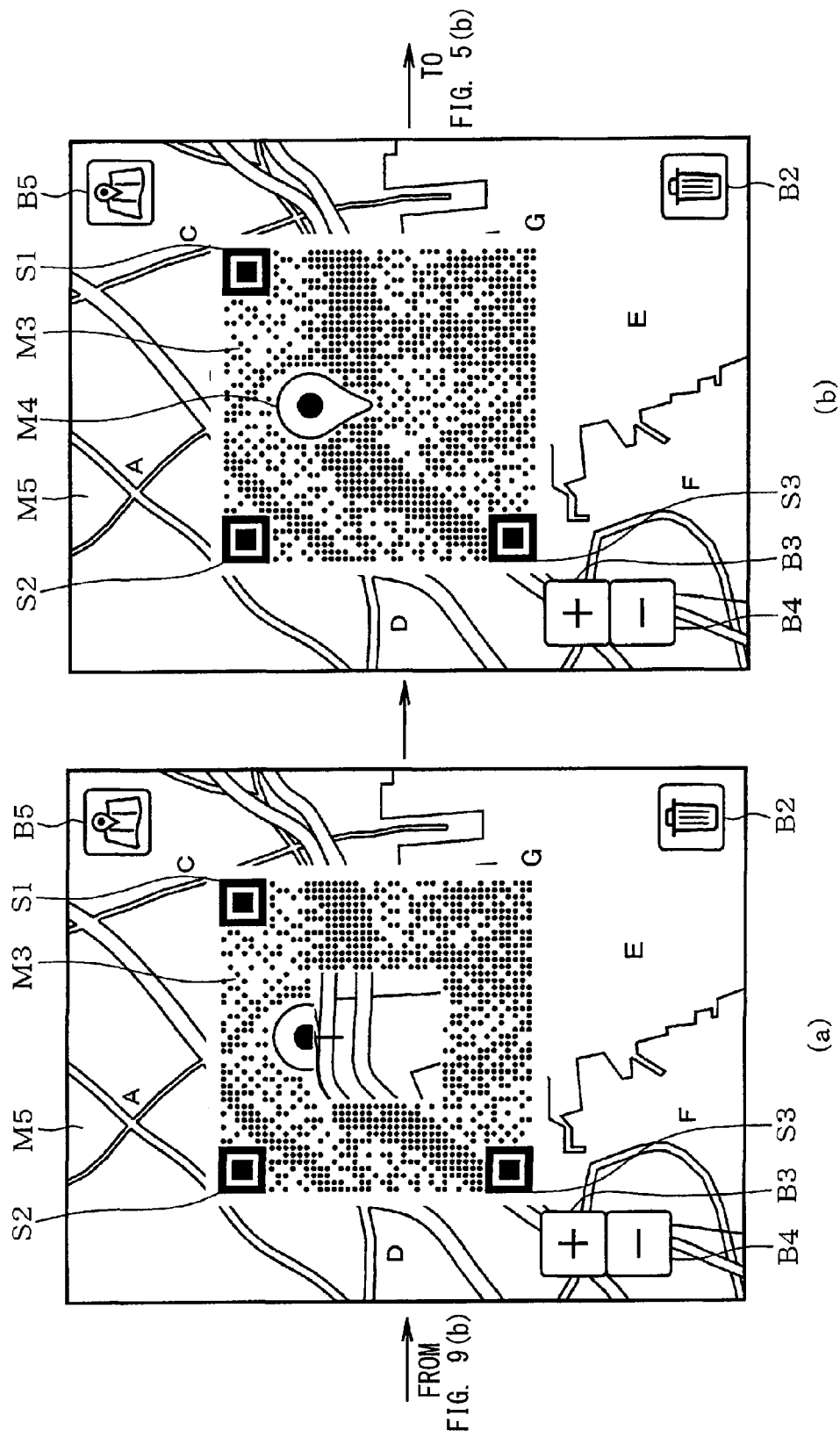
FIG. 10 is a diagram illustrating (a) and (b) showing an example in which the image changes from (b) of FIG. 9 to (b) of FIG. 5.
Figure 11:
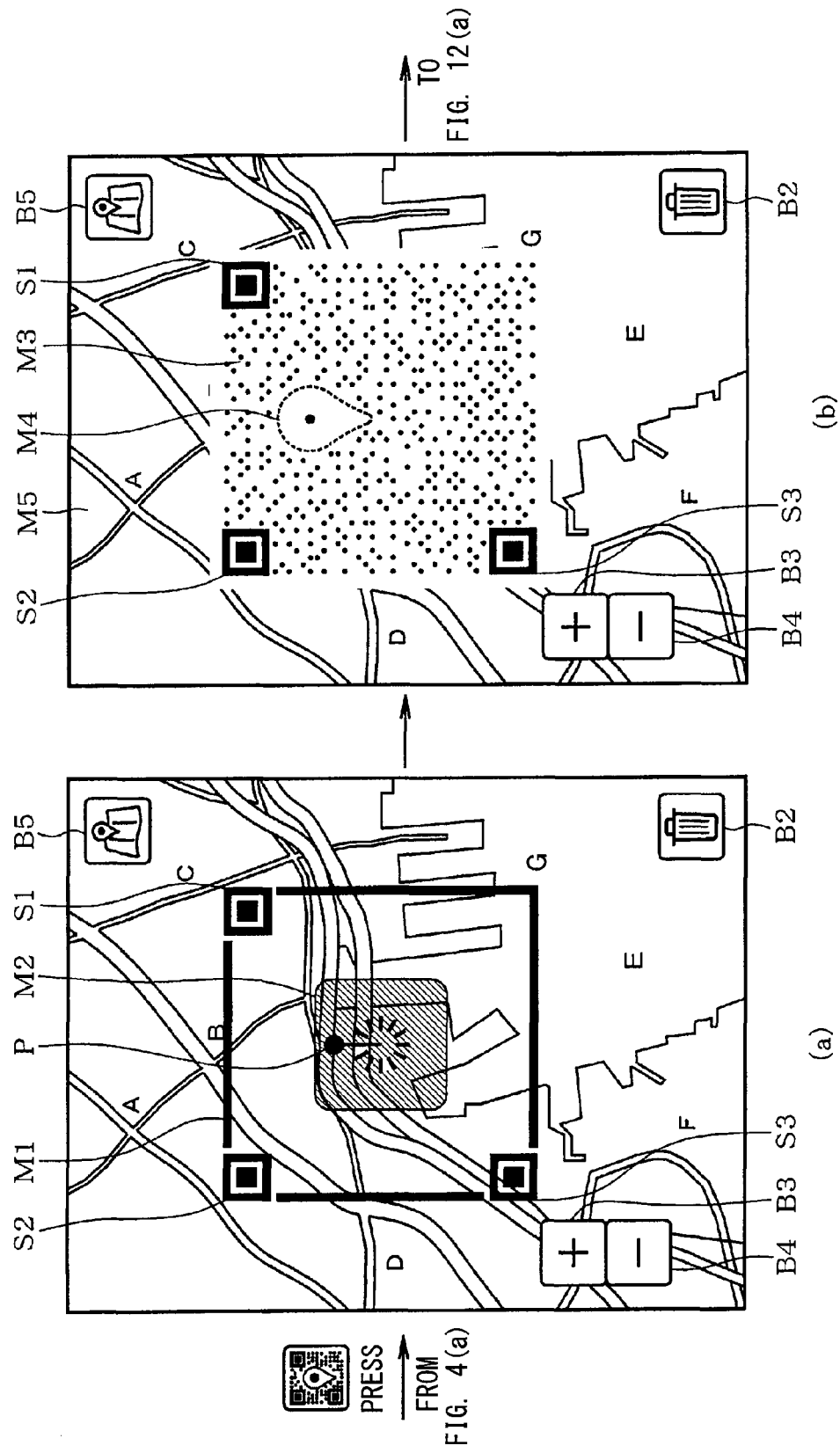
FIG. 11 is a diagram illustrating (a) and (b) showing an example in which the image changes from (a) of FIG. 4 to (a) of FIG. 12.
Figure 12:
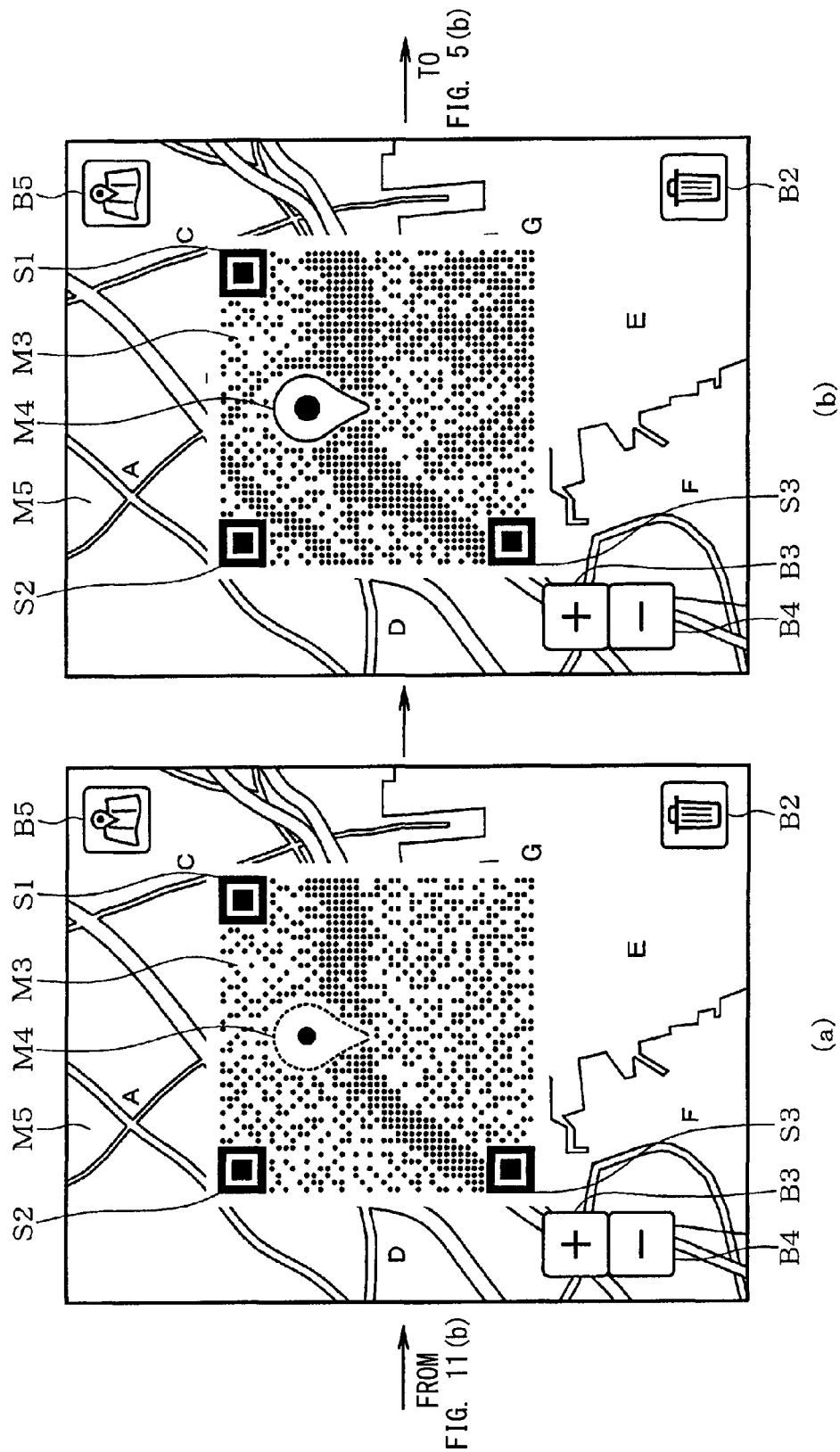
FIG. 12 is a diagram illustrating (a) and (b) showing an example in which the image changes from (b) of FIG. 11 to (b) of FIG. 5.

Then, when a predetermined time (for example, a few seconds) passes after the display of the map-image-attached QR code image M3 is started, the controller 21 causes only the map-image-attached QR code image M3 to be displayed by continuing the display of the map-image-attached QR code image M3 and ending (erasing) the display of the remaining image M5 as illustrated in (b) of FIG. 5 (A13).

Specifically, in the series of process described above, on the information communication terminal 2, the map-image-attached QR code image M3 and the remaining image M5, which is obtained by excluding an image for the conversion target area from the map image, are displayed at the same time. Accordingly, while portions for streets become unclear or names for municipal governments or facilities are erased due to QR coding in the map-image-attached QR code image M3, portions for streets remain clear and names for municipal governments or facilities (the town A, the seaside park F, and the like in FIG. 5) remain displayed in the remaining image M5. Therefore, the user may appropriately grasp the area to which the QR code is applied based on the remaining image M5 in which names for municipal governments or facilities remain displayed.

In the above description, it is determined whether the pin P is present substantially at the center of the map image when the user presses the conversion start button B1, and the pressing of the conversion start button B1 by the user is enabled on a condition that the pin P is present substantially at the center of the map image. However, it is possible to determine whether the user has pressed the conversion start button B1 on the condition that the pin P is present substantially at the center of the map image (an order of Step A2 and Step A3 shown in FIG. 3 may be opposite).

Further, this may be also applied to a case in which the user presses the conversion start button B1 when the pin P is displayed at a position distant from the center of the display area of the display part 24. Specifically, as illustrated in (a) of FIG. 6, when pressing of the conversion start button B1 by the user is detected, the controller 21 enables the pressing of the conversion start button B1 by the user even when the pin P is displayed at a position distant from the center of the display area of the display part 24 to a top-left side, for example, and specifies an area of a predetermined size centering the position of the pin P as the conversion target area. Then, upon specifying the conversion target area, the controller 21 starts to display the conversion target area notification image M1 indicating the specified conversion target area, as illustrated in (b) of FIG. 6, as well as the waiting notification image M2, and continues the same operation after this.

Moreover, this may be also applied to a case in which the pin P is not displayed in the display area of the display part 24. Specifically, as illustrated in (a) of FIG. 7, when pressing of the conversion start button B1 by the user is detected in a state in which the pin P is not displayed in the display area of the display part 24, the controller 21 enables the pressing of the conversion start button B1 by the user, and specifies a fixed area (a predetermined area) in the display area of the display part 24 as the conversion target area. Then, upon specifying the conversion target area, the controller 21 starts to display the conversion target area notification image M1 indicating the specified conversion target area, as illustrated in (b) of FIG. 7, as well as the waiting notification image M2, and continues the same operation after this.

Furthermore, the above-described configuration in which the conversion target area notification image M1 and the waiting notification image M2 are displayed during a period in which the display of the map-image-attached QR code image M3 is started after the user presses the conversion start button B1. However, the display of the conversion target area notification image M1 and the waiting notification image M2 may be omitted. Specifically, as illustrated in (a) of FIG. 8, when pressing of the conversion start button B1 by the user is detected while the map image is displayed, the controller 21 continues display only of the map image without displaying the conversion target area notification image M1 and the waiting notification image M2. Then, when the generation response signal transmitted from the server 3 is received by the reception controller 21d, the controller 21 starts to display the map-image-attached QR code image M3, as illustrated in (b) of FIG. 8. Further, the controller 21 may display only the conversion target area notification image M1 without displaying the waiting notification image M2. By contrast, the controller 21 may display only the waiting notification image M2 without displaying the conversion target area notification image M1. In addition, the controller 21 may display an image serving as both the conversion target area notification image M1 and the waiting notification image M2 (for example, an image having a portion of a size of the waiting notification image M2 as the conversion target area), instead of the conversion target area notification image M1 and the waiting notification image M2.

Moreover, the above-described configuration in which display of all of dots that configure the map-image-attached QR code image M3 are started at the same timing. However, it is possible to display how an area occupied by the dots changes over time by partially changing the timing. Specifically, as illustrated in (a) of FIG. 9 to (b) of FIG. 10, by setting timing to start displaying the dots that configure the map-image-attached QR code image M3 so that the timing is relatively earlier at an outer periphery of the conversion target area and relatively later at an inner portion of the conversion target area, the controller 21 may display the map-image-attached QR code image M3 so as to be gradually displayed from the outer periphery to the inner portion of the conversion target area. In addition, as illustrated in (a) of FIG. 11 to (b) of FIG. 12, by changing the timing to start displaying the dots that configure the map-image-attached QR code image M3 evenly over an entire conversion target area, the controller 21 may cause the map-image-attached QR code image M3 to be displayed gradually and evenly (without making unbalanced). In this case, the controller 21 may change the area occupied by the dots in a stepwise manner or in a continuous manner.

Further, it is possible to chronologically change a contrasting density of the dots that configure the map-image-attached QR code image M3. Specifically, the controller 21 may display the map-image-attached QR code image M3 so as to be gradually displayed by setting the contrasting density of the dots that configure the map-image-attached QR code image M3 to be gradually deep. In this case, the controller 21 may change the contrasting density of the dots in a stepwise manner or in a continuous manner.

Moreover, the above-described configuration in which the server 3 specifies the conversion target image to which the QR code is applied by the information code image display terminal 2 transmitting the generation request signal including the latitude-longitude information, the size information, and the scale information as the required generation information. However, the server 3 may specify the conversion target image to which the QR code is applied by the information code image display terminal 2 transmitting a generation request signal including different information as the required generation information. Specifically, the controller 21 may transmit a generation request signal including latitude-longitude information indicating at least latitude-longitude at two points of opposing corners of the conversion target area, for example. In addition, the controller 21 may transmit a generation request signal including, for example, latitude-longitude information indicating latitude-longitude of at least one corner of the conversion target area, and distances of the conversion target area in an X direction (an east-west direction in the map, for example) and in a Y direction (a north-south direction in the map, for example).

Furthermore, the above-described configuration in which the information code image display terminal 2 works in cooperation with the server 3, and the information code image display terminal 2 receives the map-image-attached QR code image M3 from the server 3. However, the information code image display terminal 2 and the server 3 may not work in cooperation with each other. Specifically, by providing a function equivalent to the QR code image generation part 31b of the server 3 for the information code image display terminal 2, the information code image display terminal 2 alone generates the map-image-attached QR code image M3 without working in cooperation with the server 3.

As described above, the following effects may be obtained according to the first embodiment.

The information code image display terminal 2 causes the map-image-attached QR code image M3 and the remaining image M5, which is obtained by excluding an image for the conversion target area from the map image, to be displayed at the same time. While portions for streets become unclear or names for municipal governments or facilities are erased due to QR coding in the map-image-attached QR code image M3, portions for streets remain clear and names for municipal governments or facilities remain displayed in the remaining image M5. Therefore, by displaying the map-image-attached QR code image M3 and the remaining image M5 at the same time, the user may appropriately grasp the area to which the QR code is applied, based on the remaining image M5 in which names for municipal governments or facilities remain displayed. In this manner, it is possible for the user to appropriately grasp the area to which the QR code is applied, and to improve convenience.

Further, as the conversion target area notification image M1 is displayed, the user may appropriately grasp the area to which the QR code is to be applied. Moreover, as the symbols S1-S3 which are marks unique to QR codes are displayed, the user may appropriately grasp that the information code used for coding is the QR code. Furthermore, as the waiting notification image M2 is displayed, the user may appropriately grasp that reception of the map-image-attached QR code image M3 from the server 3 is being waited. In addition, by adjusting the timing at which the display of the dots that configure the map-image-attached QR code image M3 is started or the contrasting density of the dots, the user may enjoy how the map-image-attached QR code image M3 changes.

(Second Embodiment)

Next, a second embodiment of the present disclosure will be described with reference to FIG. 13. Only differences from the first embodiment will be described, and the configurations and the components that are the same as in the first embodiment shall not be described. The first embodiment provides the configuration in which the information code image display terminal 2 transmits the information that allows the server 3 to specify the conversion target area (the latitude-longitude information, the size information, and the scale information) to the server 3, and the server 3 applies a QR code to map information included in the map information specified in the database 33a as the conversion target image. On the other hand, the second embodiment provides a configuration in which the information code image display terminal 2 transmits image information of a map image included in the conversion target area to the server 3, and the server 3 applies a QR code to a map image included in the image information obtained from the information code image display terminal 2 as the conversion target image.

Specifically, on the information code image display terminal 2, the controller 21 specifies the conversion target area (A4), when the display of the conversion target area notification image M1 indicating the specified conversion target area starts (A5), a generation request signal including image information for the map image included in the conversion target area as the required generation information is transmitted by the transmission controller 21c from the communication part 25 to the server 3 (A21).

On the server 3, when the generation request signal transmitted from the information code image display terminal 2 is received by the reception controller 31d (B1), the controller 31 specifies the image information included in the received generation request signal (B11). Next, the controller 31 applies a QR code to a map image included in the specified image information (the conversion target image) to generate a map-image-attached QR code image (B4). Then, the controller 31 causes a generation response signal including the map-image-attached QR code image thus generated to be transmitted by the transmission controller 31e from the communication part 34 to the information code image display terminal 2 (B5).

As described above, according to the second embodiment, the same effects as those of the first embodiment may be obtained. Further, according to the second embodiment, by the information code image display terminal 2 transmitting the image information for the map image included in the conversion target area to the server 3, the server 3 may appropriately generate the map-image-attached QR code image M3 even when the server 3 does not store the image information to be the conversion target image, and thus an appropriate response is possible. For example, even when a QR code is applied only to a part of an image (of a person's face, landscape, and the like) obtained by the camera 26 or an entire image obtained by the information code image display terminal 2 by activating an application, the user may appropriately grasp the area to which the QR code is applied. For example, even when a QR code is applied only to a part of an image in which a plurality of persons are gathering, the user may appropriately grasp the area (person) to which the QR code is applied, based on a person to which a QR code is not applied.

(Other Embodiments)

The present disclosure is not limited to the above embodiments, and may be modified and altered in any manner without departing from the scope of the invention.

While a QR code is taken as an example of the information code in the present embodiment, a two-dimensional code other than the QR code, a one-dimensional code, or a frame-shaped two-dimensional code may be employed. Further, while a smartphone is taken as an example of the information code image display terminal 2 in the present embodiment, a simple mobile phone having a display area smaller than that of a smartphone, or tablet terminal having a display area larger than that of a smartphone may be employed.

In the present embodiment, the configuration in which the server 3 includes the function for generating a QR code image and the function for storing the map information is taken as one example. However, a server having the function for generating a QR code image and a server having the function for storing the map information may be separate.

In the present embodiment, the above described configuration in which the display of the remaining image M5 is erased when a predetermined time passes after the display of the map-image-attached QR code image M3 is started. However, it is possible to provide a remaining image erase button, for example, and to erase the remaining image M5 based on a condition that the user presses the remaining image erase button. Further, it is possible for the user to set whether the remaining image M5 is erased automatically or manually.

The controller 21 corresponds to a terminal-side controller. The map information acquisition part 21a corresponds to a map information acquisition part. The transmission controller 21c corresponds to a terminal-side transmission controller. The reception controller 21d corresponds to a terminal-side reception controller. The controller 31 corresponds to a server-side controller. The QR code image generation part 31b corresponds to an image generation part. The transmission controller 31c corresponds to a server-side transmission controller. The reception controller 31d corresponds to a server-side reception controller.

The embodiments may be implemented in various manners such as a non-transitory computer-readable recording medium in which a program is recorded, and a program product stored in a non-transitory computer-readable recording medium.

It is noted that a flowchart or the processing of the flowchart in the present application includes multiple steps (also referred to as sections), each of which is represented, for instance, as A1, B1. Further, each step can be divided into several sub-steps while several steps can be combined into a single step.

While various embodiments, configurations, and aspects of the information code image display system, the information code image display terminal, the information code image display program, the server, and the information code image generating program according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. An information code image display system comprising:
an area specifying part that specifies an area as a conversion target area upon occurrence of a generation request for an information code image, the area being a part of an entire base image displayed in a display area of a display part;
an image generation part that generates a base-image-attached information code image by applying an information code to a conversion target image corresponding to the conversion target area specified by the area specifying part; and
a display controller that displays the base-image-attached information code image and a remaining image at a same time in the display part, the base-image-attached information code image being generated by the image generation part, the remaining image being obtained by excluding an image of the conversion target area from the base image,
wherein:
the display controller starts display of a part of dots that configure the base-image-attached information code image at different timing.

2. The information code image display system according to claim 1, wherein:
upon occurrence of a generation request for an information code image, the display controller displays a conversion target area notification image in the display part, the conversion target area notification image indicating the conversion target area.

3. The information code image display system according to claim 2, wherein:
the display controller uses, as the conversion target area notification image, an image including a mark unique to the information code.

4. The information code image display system according to claim 1, wherein:
the display controller displays a waiting notification image in the display part after the occurrence of the generation request for an information code image before display of at least a part of the base-image-attached information code image is started, the waiting notification image indicating that display of at least the part of the base-image-attached information code image is being waited.

5. The information code image display system according to claim 1, wherein:
upon occurrence of a user operation indicating a generation request for an information code image, the area specifying part specifies that the generation request for the information code image has occurred.

6. The information code image display system according to claim 1, wherein:
when the base image includes a reference point, the area specifying part specifies an area based on the reference point as the conversion target area.

7. The information code image display system according to claim 1, wherein:
when the base image includes no reference point, the area specifying part specifies a predetermined area in a display area of the display part as the conversion target area.

8. The information code image display system according to claim 1, further comprising:
a map information acquisition part that obtains map information,
wherein:
as the base image, the area specifying part uses a map image included in the map information obtained by the map information acquisition part.

9. The information code image display system according to claim 1, wherein:
as the conversion target image, the image generation part uses a part of an image derived from image information identical to image information that configures the base image.

10. The information code image display system according to claim 1, wherein:
as the conversion target image, the image generation part uses a part of an image derived from image information different from image information that configures the base image.

11. The information code image display system according to claim 1, comprising:
a server; and
an information code image display terminal that is accessible to the server, wherein:
the area specifying part and the display controller are provided in the information code image display terminal; and
the image generation part is provided in the server.

12. An information code image display system comprising:
an area specifying part that specifies an area as a conversion target area upon occurrence of a generation request for an information code image, the area being a part of an entire base image displayed in a display area of a display part;
an image generation part that generates a base-image-attached information code image by applying an information code to a conversion target image corresponding to the conversion target area specified by the area specifying part; and
a display controller that displays the base-image-attached information code image and a remaining image at a same time in the display part, the base-image-attached information code image being generated by the image generation part, the remaining image being obtained by excluding an image of the conversion target area from the base image, wherein:
when dots that configure the base-image-attached information code image are displayed, the display controller chronologically changes a contrasting density of at least a part of the dots.

13. An information code image display system comprising:
an area specifying part that specifies an area as a conversion target area upon occurrence of a generation request for an information code image, the area being a part of an entire base image displayed in a display area of a display part;
an image generation part that generates a base-image-attached information code image by applying an information code to a conversion target image corresponding to the conversion target area specified by the area specifying part; and
a display controller that displays the base-image-attached information code image and a remaining image at a same time in the display part, the base-image-attached information code image being generated by the image generation part, the remaining image being obtained by excluding an image of the conversion target area from the base image, wherein:
the display controller displays only the base-image-attached information code image in the display part by displaying the base-image-attached information code image and the remaining image at the same time in the display part and then ending display of the remaining image to continue display of the base-image-attached information code image.

14. An information code image display terminal accessible to a server, the information code image display terminal comprising:
an area specifying part that specifies an area as a conversion target area upon occurrence of a generation request for an information code image, the area being a part of an entire base image displayed in a display area of a display part;
a terminal-side transmission controller that transmits required generation information to the server, the required generation information being information required for generation of a base-image-attached information code image;
a terminal-side reception controller that receives a base-image-attached information code image from the server; and
a display controller that displays the base-image-attached information code image and a remaining image at a same time in the display part, the base-image-attached information code image being received by the terminal-side reception controller, the remaining image being obtained by excluding an image of the conversion target area from the base image,
wherein:
the display controller starts display of a part of dots that configure the base-image-attached information code image at different timing.

15. A non-transitory computer-readable storage medium storing an information code image display program that causes a terminal-side controller of an information code image display terminal accessible to a server to execute:
an area specifying process of specifying an area as a conversion target area upon occurrence of a generation request for an information code image, the area being a part of an entire base image displayed in a display area of a display part;
a terminal-side transmission control process of transmitting required generation information to the server, the required generation information being information required for generation of a base-image-attached information code image;
a terminal-side reception control process of receiving a base-image-attached information code image from the server; and
a display control process of displaying the base-image-attached information code image and a remaining image at a same time in the display part, the base-image-attached information code image being received in the terminal-side reception control process, the remaining image being obtained by excluding an image of the conversion target area from the base image,
wherein:
the display controller starts display of a part of dots that configure the base-image-attached information code image at different timing.

16. An information code image display terminal accessible to a server, the information code image display terminal comprising:
an area specifying part that specifies an area as a conversion target area upon occurrence of a generation request for an information code image, the area being a part of an entire base image displayed in a display area of a display part;
a terminal-side transmission controller that transmits required generation information to the server, the required generation information being information required for generation of a base-image-attached information code image;
a terminal-side reception controller that receives a base-image-attached information code image from the server; and
a display controller that displays the base-image-attached information code image and a remaining image at a same time in the display part, the base-image-attached information code image being received by the terminal-side reception controller, the remaining image being obtained by excluding an image of the conversion target area from the base image,
wherein:

when dots that configure the base-image-attached information code image are displayed, the display controller chronologically changes a contrasting density of at least a part of the dots.

17. An information code image display terminal accessible to a server, the information code image display terminal comprising:
- an area specifying part that specifies an area as a conversion target area upon occurrence of a generation request for an information code image, the area being a part of an entire base image displayed in a display area of a display part;
- a terminal-side transmission controller that transmits required generation information to the server, the required generation information being information required for generation of a base-image-attached information code image;
- a terminal-side reception controller that receives a base-image-attached information code image from the server; and
- a display controller that displays the base-image-attached information code image and a remaining image at a same time in the display part, the base-image-attached information code image being received by the terminal-side reception controller, the remaining image being obtained by excluding an image of the conversion target area from the base image, wherein:
the display controller displays only the base-image-attached information code image in the display part by displaying the base-image-attached information code image and the remaining image at the same time in the display part and then ending display of the remaining image to continue display of the base-image-attached information code image.

18. A non-transitory computer-readable storage medium storing an information code image display program that causes a terminal-side controller of an information code image display terminal accessible to a server to execute:
- an area specifying process of specifying an area as a conversion target area upon occurrence of a generation request for an information code image, the area being a part of an entire base image displayed in a display area of a display part;
- a terminal-side transmission control process of transmitting required generation information to the server, the required generation information being information required for generation of a base-image-attached information code image;
- a terminal-side reception control process of receiving a base-image-attached information code image from the server; and
- a display control process of displaying the base-image-attached information code image and a remaining image at a same time in the display part, the base-image-attached information code image being received in the terminal-side reception control process, the remaining image being obtained by excluding an image of the conversion target area from the base image, wherein:
when dots that configure the base-image-attached information code image are displayed, the display controller chronologically changes a contrasting density of at least a part of the dots.

19. A non-transitory computer-readable storage medium storing an information code image display program that causes a terminal-side controller of an information code image display terminal accessible to a server to execute:
- an area specifying process of specifying an area as a conversion target area upon occurrence of a generation request for an information code image, the area being a part of an entire base image displayed in a display area of a display part;
- a terminal-side transmission control process of transmitting required generation information to the server, the required generation information being information required for generation of a base-image-attached information code image;
- a terminal-side reception control process of receiving a base-image-attached information code image from the server; and
- a display control process of displaying the base-image-attached information code image and a remaining image at a same time in the display part, the base-image-attached information code image being received in the terminal-side reception control process, the remaining image being obtained by excluding an image of the conversion target area from the base image, wherein:
the display controller displays only the base-image-attached information code image in the display part by displaying the base-image-attached information code image and the remaining image at the same time in the display part and then ending display of the remaining image to continue display of the base-image-attached information code image.

\* \* \* \* \*